United States Patent
Xie et al.

(10) Patent No.: US 8,854,397 B2
(45) Date of Patent: Oct. 7, 2014

(54) PHOTO SELECTION FOR MOBILE DEVICES

(75) Inventors: Tao Xie, Bellevue, WA (US); Michael Dudley Johnson, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 300 days.

(21) Appl. No.: 13/324,284

(22) Filed: Dec. 13, 2011

(65) Prior Publication Data

US 2013/0147845 A1     Jun. 13, 2013

(51) Int. Cl.
*G09G 5/00*       (2006.01)

(52) U.S. Cl.
USPC ........................................... 345/660; 382/286

(58) Field of Classification Search
CPC .. H04L 29/06; H04L 29/08072; G06Q 10/10; G06F 3/0481; G06F 9/4443
USPC ........................................... 345/660; 382/286
See application file for complete search history.

(56) References Cited

U.S. PATENT DOCUMENTS

| 7,788,596 B2 | 8/2010 | Iwabuchi |
| 2005/0134693 A1* | 6/2005 | Torimoto et al. ........ 348/207.99 |
| 2007/0174489 A1* | 7/2007 | Iwabuchi ...................... 709/246 |
| 2008/0158612 A1 | 7/2008 | Iwasaki |
| 2009/0048921 A1* | 2/2009 | Tokuda et al. .................. 705/14 |
| 2010/0062796 A1* | 3/2010 | Hayton et al. ................ 455/466 |
| 2010/0253766 A1* | 10/2010 | Mann et al. ..................... 348/51 |
| 2012/0134595 A1* | 5/2012 | Fonseca et al. ............... 382/195 |

FOREIGN PATENT DOCUMENTS

| EP | 1545116 A2 | 6/2005 |
| WO | 2011-018759 A1 | 2/2011 |

OTHER PUBLICATIONS

International Search Report and Written Opinion for International Application PCT/US2012/069123, Mar. 4, 2013.

\* cited by examiner

*Primary Examiner* — Maurice L McDowell, Jr.
(74) *Attorney, Agent, or Firm* — Baker Botts L.L.P.

(57) ABSTRACT

In one embodiment, a server receives from a mobile device a request for one or more images. The server adjusts one or more of the requested images, based at least partly on the display capabilities of the mobile device, to have a landscape orientation or a portrait orientation, then sends the adjusted image to the mobile device.

16 Claims, 7 Drawing Sheets

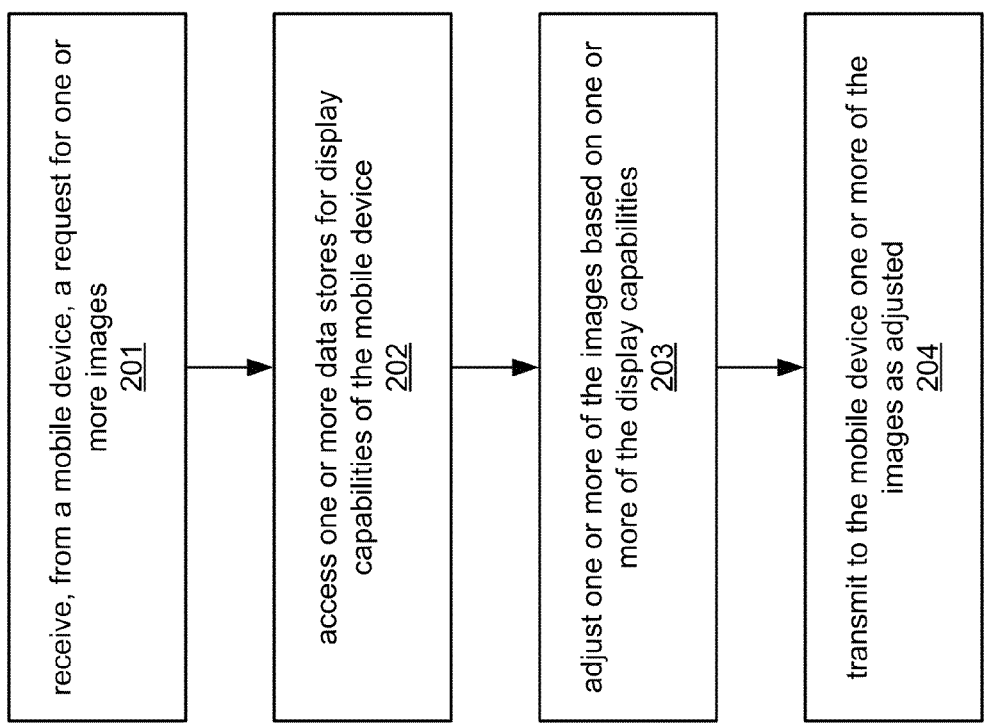

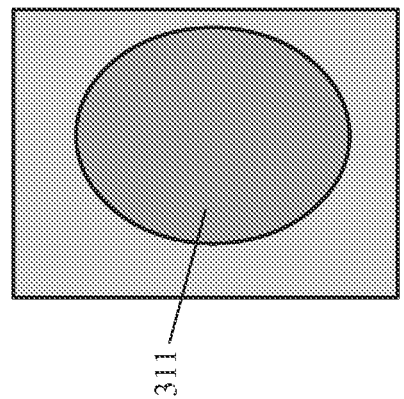
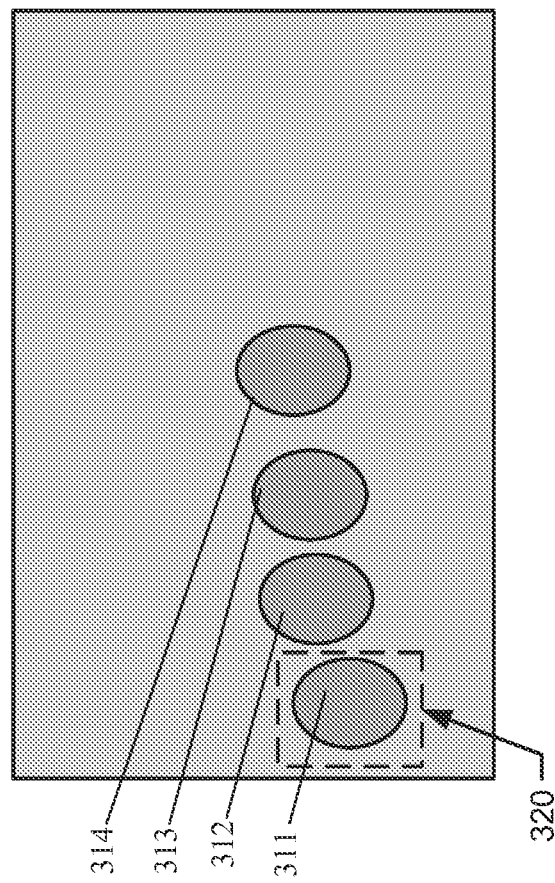

PHOTO SELECTION FOR MOBILE DEVICES

TECHNICAL FIELD

This disclosure generally relates to mobile devices.

BACKGROUND

A content-distribution network (CDN) may be a system of computers (e.g. edge servers) that cache or store copies of data at various locations. By placing copies of data at locations near end users, a CDN may improve access to the data by increasing access bandwidth and redundancy while reducing access latency. Data cached in a CDN may include, for example, text, graphics, media files (e.g. audio, photo, or video), scripts, Uniform Resources Locators (URLs), and database queries.

A social-networking system, such as a social-networking website, may enable its users to interact with it and with each other through it. The social-networking system may create and store a record (such as a user profile) associated with the user. The user profile may include demographic information on the user, communication-channel information for the user, and personal interests of the user. The social-networking system may also create and store a record of the user's relationships with other users in the social-networking system (e.g. a social graph), as well as provide social-networking services (e.g. wall-posts, photo-sharing, or instant-messaging) to facilitate social interaction between or among users in the social-networking system.

BRIEF DESCRIPTION OF THE DRAWINGS

FIG. 2 illustrates an example method of adjusting images for delivery to a mobile device.

FIGS. 3A-3I illustrate adjusting an image for delivery to a mobile device.

DESCRIPTION OF EXAMPLE EMBODIMENTS

Figure 1:
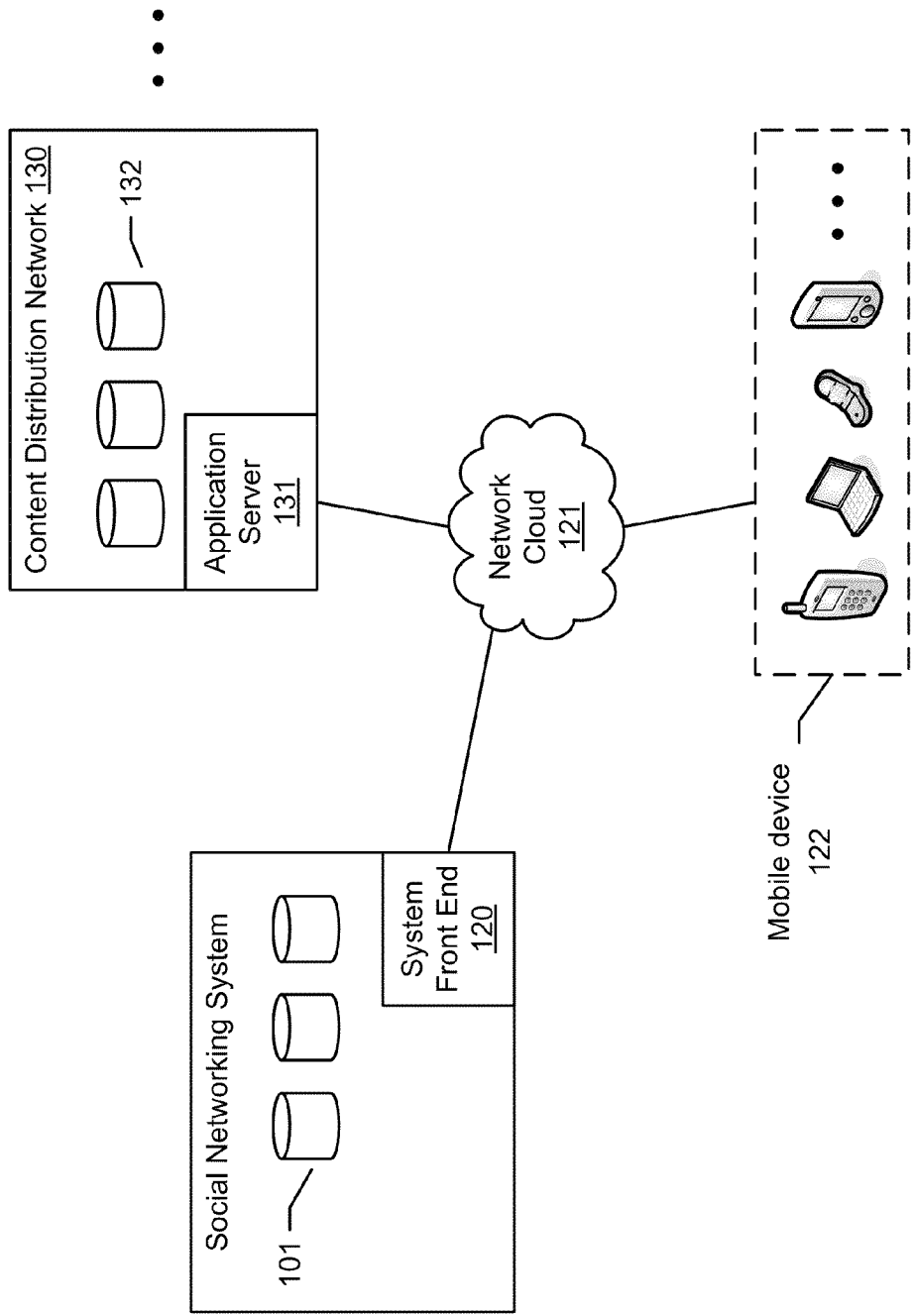
FIG. 1 illustrates an example network environment of a social networking system.

A social networking system may store records of users and relationships between users in a social graph comprising a plurality of user nodes, a plurality of concept nodes, and a plurality of edges connecting the nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various system, including the social networking system. For example, the user may provide his name, profile picture, contact information, birth date, gender, marital status, family status, employment, education background, preferences, interests, and other demographical information to be included in the user node. Each user node of the social graph may correspond to a web page (typically known as a profile page). For example, in response to a request including a user name, the social networking system can access a user node corresponding to the user name, and construct a profile page including the name, a profile picture, and other information associated with the user. A concept node may correspond to a concept of the social networking system. For example, a concept can represent a real-world entity, such as a movie, a song, a sports team, a celebrity, a restaurant, or a place or a location. An administrative user of a concept node corresponding to a concept may create the concept node by providing information of the concept (e.g., by filling out an online form), causing the social networking system to create a concept node comprising information associate with the concept. Each concept node of the social graph may correspond to a web page. For example, in response to a request including a name, the social networking system can access a concept node corresponding to the name, and construct a web page including the name and other information associated with the concept. An edge between a pair of nodes may represent a relationship between the pair of nodes. For example, an edge between two user nodes can represent a friendship between two users. For example, the social networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social networking system a request to create an edge between a user node of the user and a concept node of the concept, indicating a relationship between the user and the concept (e.g., the user checks in a restaurant, or the user likes a celebrity). In addition, the degree of separation between any tow nodes is defined as the minimum number of hops required to traverse the social graph from one node to the other. A degree of separation between two nodes can be considered a measure of relatedness between the users or the concepts represented by the two nodes in the social graph.

A social networking system may support a variety of applications, such as photo sharing, on-line calendars and events, and instant messaging. For example, the social networking system may also include media sharing capabilities. For example, the social networking system may allow users to post photographs and other multimedia files to a user's profile page (typically known as wall posts) or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations and identities of other users.

FIG. 1 illustrates an example network environment of a social networking system. In particular embodiments, a social networking system may comprise one or more data stores 101. For example, the social networking system may store user profile data and social graph information in data stores 101. For example, each data store 101 may comprise one or more storage devices. In particular embodiments, the social networking system may comprise one or more computing devices (e.g., servers) hosting functionality directed to operation of the social networking system. In particular embodiments, one or more of data stores 101 may be operably connected to the social networking system's front end 120. A user of the social networking system may access the social networking system using a client device such as mobile device 122. In particular embodiments, front end 120 may interact with mobile device 122 through network cloud 121. For example, front end 120 may be implemented in software programs hosted by one or more computing devices of the social networking system. Front end 120 may include web or HTTP server functionality, as well as other functionality, to allow users to access the social networking system.

Mobile device 122 is generally a portable computer or computing device including functionality for communicating (e.g., remotely) over a network. For example, mobile device 122 can be a mobile phone, a tablet computer, a laptop computer, a handheld game console, an electronic book reader, or any other suitable portable devices. Mobile device 122 may execute one or more client applications, such as a web browser (e.g., Microsoft Windows Internet Explorer, Mozilla Firefox, Apple Safari, Google Chrome, and Opera, etc.) or special-purpose client application (e.g., Microsoft Outlook, Facebook for iPhone, etc.), to access or view content over a computer network.

Network cloud 121 may represent a network or collection of networks (such as the Internet, a corporate intranet, a virtual private network, a local area network, a wireless local area network, a cellular network, a wide area network, a metropolitan area network, or a combination of two or more such networks) over which mobile devices 122 may access the social network system.

In particular embodiments, the social networking system may store in data stores 101 data associated with applications and services provided by the social networking system. In particular embodiments, the social networking system may store user event data in data stores 101. For example, a user may register a new event by accessing a client application to define an event name, a time and a location, and cause the newly created event to be stored (e.g., as a concept node) in data stores 101. For example, a user may register with an existing event by accessing a client application to confirming attending the event, and cause the confirmation to be stored in data stores 101. For example, the social networking system may store the confirmation by creating an edge in a social graph between a user node corresponding to the user and a concept node corresponding to the event, and store the edge in data stores 101.

In particular embodiments, the social networking system may store location data in data stores 101. For example, a node of a social graph stored in data stores 101 may comprise location data associated with a user or a concept. For example, location data associated with a concept (e.g., a restaurant) can be an address, or a geographic location (e.g., a set of geographic coordinates in latitude and longitude). For example, location data associated with a user can be an address, or a geographic location of the user's client device (e.g., as determined by IP address, cell tower triangulation, Wi-Fi positioning, Global Positioning System or GPS positioning, or any combinations of two or more of those positioning methods). For example, location data associated with a user can be a location of a concept related to the user (e.g., as determined by a edge between a user node of the user and a concept node of the concept). For example, a user's location can be a location of an event that the user is attending. For example, a user's location can be a location of a restaurant that the user just checks in to.

In particular embodiments, the social networking system may store media files in data stores 101. For example, a user can use a client application to upload a photo or a set of photos (often called a photo album), or a video or audio clip, to the social networking system, causing the social networking system to store the photos or clips in data stores 105. In particular embodiments, a media file stored in data stores 105 may contain metadata (often called "tags") associated with the media file. For example, a photo shot by a digital camera may contain metadata relating to file size, resolution, time stamp, name of the camera maker, and/or location (e.g., GPS) coordinates. A user can add additional metadata values to a photo, or tag a photo, during or in connection with an upload process. Some examples of tags of a media file are author, title, comments, event names, time, location, names of people appearing in the media file, or user comment. For example, tags of a media file can be implemented with the Exchangeable image file format (Exif), or a modified version thereof. U.S. Pat. No. 7,945,653, herein incorporated by reference in its entirety and for all purposes, describes methods of enabling a first user of a social networking system to select a region of a photo and associate the selected region to a second user, and in response to a confirmation from the second user, storing the association in a database. For example, the social networking system may store the association between photo and the second user by creating an edge between a user node corresponding to the second user and a concept node corresponding to the photo, and store the edge in data stores 101.

The social networking system may transmit to a user's mobile device 122 one or more images to be displayed by mobile device 122. For example, a user may select a link (e.g., a selectable thumbnail image) in a user profile page displayed in a graphical user interface of an application (e.g., a web browser) hosted by the user's mobile device 122, causing mobile device 122 to transmit to the social networking system a request comprising the link. In response to the request, system front end 120 may access data stores 101 for one or more images corresponding to the link, and transmit the images to mobile device 122. The application may display the received images in its graphical user interface. The social networking system may store copies of images (stored in data stores 101) in one or more content distribution networks 130. Content distribution network 130 may comprise application server 131 operatively connected to one or more content data stores 132 storing copies of images from the social networking system. For example, each content data store 132 may comprise one or more storage devices. The social networking system may communicate and access content distribution network 130, and vise versa, through network cloud 121. A user using mobile device 122 may communicate with content distribution network 130 through network cloud 121. For example, in response to the user's request described above, system front end 120 of the social networking system may communicate with content distribution network 130 (or cause mobile device 121 to communicate with content distribution network 130), causing application server 131 to access content data stores 132 for copies of the images corresponding to the link, and transmit the copies of the images to the user's mobile device 122.

A display of a mobile device can often have a display resolution relatively smaller than an original size of an image stored in the social networking system or content distribution network 130. A display of a mobile device can often have an aspect ratio (e.g., a ratio of width by length) different from an image stored in the social networking system or content distribution network 130. Furthermore, an aspect ratio of a display of a mobile device may depend on an orientation (e.g., portrait mode, or landscape mode) of the mobile device. For example, display resolution of a mobile device can be 960 by 640 pixels in landscape mode, or 640 by 960 pixels in portrait mode, while an image stored in social networking system or content distribution network 130 can have many sizes and aspect ratios (e.g., 1920 by 1080 pixels, 1064 by 1600 pixels, 1600 by 1200 pixels, 1200 by 1200 pixels, etc.). In addition, different models (from different manufactures) of mobile devices can have different display resolutions and display aspect ratios. It is desirable to adjust an image before transmitting the image to a mobile device to reduce the image's size (for a relatively smaller display resolution of a mobile device), and thus reducing bandwidth load for transmitting the image. If a user of a mobile device is charged by the amount of data usage with the mobile device, reducing sizes of images that the user receives at the mobile device may also reduce the usage charge for the user. It is also desirable to adjust an image before transmitting the image to a mobile device to match the adjusted image's aspect ratio to an aspect ratio of a display of the mobile device. An image adjusted for a mobile device's display resolution and display aspect ratio may also reduce computing resource requirement for manipulating the image for displaying at the mobile device, thus improving user experience (e.g., smoother animation). As a mobile device often runs solely on its battery, reducing usage of computing resource of the mobile device may extend the mobile device's battery life.

Particular embodiments herein describe methods of adjusting images before transmitting the images to a mobile device. Particular embodiments may adjust the images based on the mobile device's display capabilities. FIG. 2 illustrates an example method of adjusting images for delivery to a mobile device. The example method of FIG. 2 can be implemented by a server-side process hosted by one or more computing devices of the social networking system. In particular embodiments, the server-side process may receive, from a mobile device (e.g., mobile device 122), a request for one or more images (201). In particular embodiments, the request may comprise an identifier of the mobile device. For example, a user may access a structured document served by the social networking system (e.g., a user profile page, or a web page corresponding to a concept of the social networking system) in a graphical user interface of an application (e.g., a web browser) hosted by the user's mobile device. The user may select a link to one or more images (e.g., a selectable thumbnail image) incorporated in the structured document, causing the mobile device to transmit to the social networking system a request comprising the link. The request may comprise an identifier of the mobile device coded using a user-agent header field of Hypertext Transfer Protocol (HTTP). Example strings of the user-agent header field for HTC Desire mobile phone by HTC Corporation and iPad tablet by Apple, Inc., are listed below, respectively:

Mozilla/5.0 (Linux; U; Android 2.1-update1; de-de; HTC Desire
1.19.161.5 Build/ERE27) AppleWebKit/530.17 (KHTML, like Gecko)
Version/4.0 Mobile Safari/530.17
Mozilla/5.0 (iPad; U; CPU OS 3_2_1 like Mac OS X; en-us)
AppleWebKit/531.21.10 (KHTML, like Gecko) Mobile/7B405

In particular embodiments, the server-side process may access one or more data stores for display capabilities of the mobile device (202). In particular embodiments, the server-side process may access the one or more data stores based on the identifier of the mobile device. For example, the server-side process can, based on the identifier of the mobile device, access a device description repository for display capabilities of the mobile device. The device description repository can be stored in a third-party website (e.g., Wireless Universal Resource FiLe or WURFL) or in data stores 101. For example, display capabilities of a mobile device can be display resolution (in pixels) in the mobile device's display's width direction and display resolution (in pixels) in the display's height direction. For example, display capabilities of a mobile device can be physical sizes in millimeters (width and height) of the mobile device's display. For example, display capabilities of a mobile device can be whether the mobile device's display supports more than two orientations for viewing (e.g., portrait mode and landscape mode). Particular embodiments contemplate any suitable methods of determining display capabilities of the mobile device. For example, the request (for the one or more images) may comprise display capabilities (e.g., display resolution) of the mobile device (e.g., as part of the user-agent header string of an HTTP request).

Figure 3C:
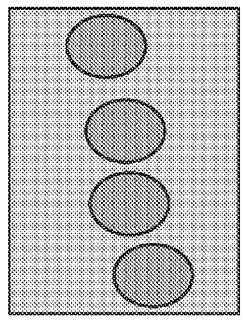
Figure 3D:
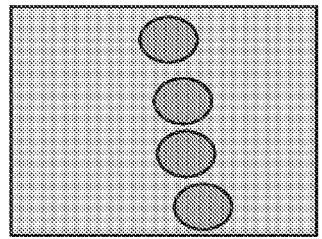
Figure 3A:
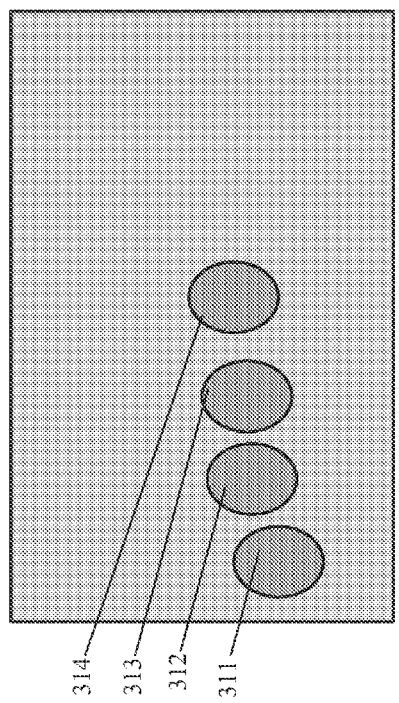
Figure 3B:
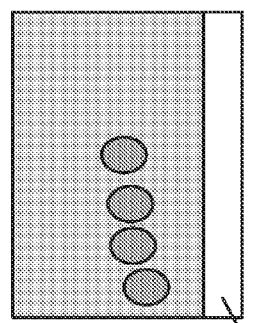

In particular embodiments, the server-side process may access data stores 101 for the images, and adjust one or more of the images based on one or more of the display capabilities (203). FIG. 3A illustrates an example image of a relatively high resolution. The example image of FIG. 3A has four objects (311, 312, 313, 314) within the image. The objects can be people (or faces) or physical objects (e.g., vases, buildings, etc.). In particular embodiments, the server-side process may adjust an image by scaling the image. For example, the server-side process can scale down the image of FIG. 3A to be within a mobile device's relatively low display resolution. By scaling downward and reducing the image's size, particular embodiments can reduce bandwidth requirement for transmitting the image to the mobile device. The scaled image may leave white space (321) if the image's aspect ratio does not match the display's aspect ratio, as illustrated in FIG. 3B.

In particular embodiments, the server-side process may adjust an image by cropping the image. For example, the server-side process can identify objects in the image of FIG. 3A (e.g., by using a face recognition software or an object recognition software), identify a region of the image that includes the objects and is of a same aspect ratio of the mobile device's display, and remove (crop) the portion outside the identified region from the image. By cropping and reducing the image's size, particular embodiments can accentuate subject matter of the image (e.g., the four objects in the example image of FIG. 3A) and reduce bandwidth requirement for transmitting the image to the mobile device. FIGS. 3C-3D illustrate example cropped images of the example image of FIG. 3A. FIG. 3C illustrates an example cropped image in a landscape mode of the mobile device. FIG. 3D illustrates an example cropped image in a portrait mode of the mobile device. Particular embodiments may determine cropping an image for delivery to a mobile device in a landscape mode, or in a portrait mode, or in both landscape and portrait modes (i.e., producing two cropped images for each mode respectively) based device capabilities of the mobile device, a preference of a user of the mobile device, a preference of an application displaying the image on the mobile device, or any combinations of these factors. For example, if the mobile device may have a default orientation (e.g., portrait mode), the server-side process can crop an image for delivery to the mobile device in the default orientation. For example, a user of the mobile device may prefer viewing photos in portrait mode with the mobile device and store his/her preference in data stores 101. Or a client application hosted by the mobile device can determine a preferred orientation based on the user's usage patterns, and transmit to the social networking system a message comprising the user's preferred orientation, causing the social networking system to store the user's preferred orientation in data stores 101. Or the social networking system can determine a preferred orientation based on the user's usage patterns, and store the user's preferred orientation in data stores 101. The server-side process can access data stores 101 (e.g., based on a user identifier included in the request for the image) for the user's preference, and crop the image in the preferred orientation (e.g., portrait mode). For example, a photo-viewing application of the mobile device may have a preferred orientation (e.g., landscape mode) stored in data stores 101. The server-side process can access data stores 101 (e.g., based on an application identifier included in the request of the image) for the preferred orientation, and crop the image in the preferred orientation (e.g., landscape mode). For example, if there is not preferred orientation for displaying, the server-side process may crop the image in both landscape and portrait modes—i.e., producing one cropped image in landscape mode and one cropped image in portrait mode for delivery to the mobile device.

Instead of display capabilities of a mobile device, particular embodiments may adjust an image for delivery to the mobile device based on a size of a container (e.g., a frame, a window) displaying the image at the mobile device. For example, an application hosted by the mobile device may display the image in a frame overlaying a web page in the application's graphical user interface. The mobile device may transmit to the social networking system a request including a size (e.g., length and width) of the container. In response to the request, the server-side process can scale or crop the image to fit within the size of the container. In other embodiments, the server-side process may determine a size of a container for an image based on display capabilities of the mobile device, a particular layout of a structured document display the web page, user interface capabilities of the mobile device (e.g., a touch screen or a click wheel), data transmission to the mobile device (e.g., a cellular network or a Wi-Fi network), or any combination of two or more of these factors.

Figure 3E:
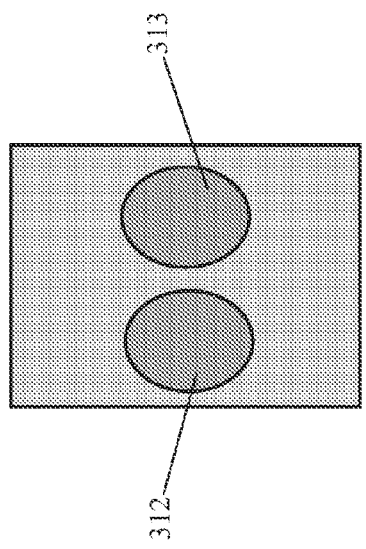

Particular embodiments may adjust an image for delivery to a mobile device based on one or more social contacts of a user of the mobile device. For example, particular embodiments may crop the image to include only one or more social contacts of the user. For example, the server-side process may receive a request for the example image of FIG. 3A from a user's mobile device. The server-side process may access data stores 101 (e.g., based on a user identifier included in the request) and identify object 313 as a face of the user (e.g., by using a facial recognition software to compare the example image to the user's profile picture stored in data stores 101). The server-side process may access social graph information stored in data stores 101, and identify (e.g., by using a facial recognition software or an object recognition software to compare the example image to images stored in data stores 101) one or more other objects in the example image of FIG. 3A that are within a pre-determined threshold degree of separation from the user. For example, the server-side process may identify object 312 as a first-degree friend of the user. For example, the server-side process may identify object 312 as a celebrity that the user likes (e.g., as there is an edge connecting a user node corresponding to the user and a concept node corresponding to the celebrity in the social graph). The server-side process can crop the example image of FIG. 3A to include only objects 313 and 314 (and fit within the size of the mobile device's display or a container), as illustrated in FIG. 3E.

Figure 3F:
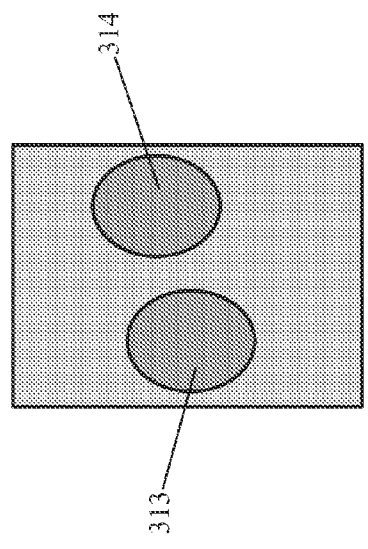

Particular embodiments may adjust an image for delivery to a mobile device based on location data indicating a location of a user associated with the mobile device. For example, the server-side process may receive a request for the example image of FIG. 3A from a user's mobile device. The server-side process may access data stores 101 and identify objects 313 as a face of the user. The server-side process may access data stores 101 for the user's location (e.g., the user is currently in Paris, or the example image is from a photo album for the user's trip to Paris). The server-side process may access data stores 101 for images of physical objects of the user's location and identify one or more objects in the example image related to the user's location. For example, the server-side process may identify object 314 as a physical object (e.g., Arc de Triomphe) of the user's location (e.g., Paris), and crop the example image of FIG. 3A to include only objects 313 and 314 (and fit within the size of the mobile device's display or a container), as illustrated in FIG. 3F.

Particular embodiments may adjust one or more images for delivery to a mobile device based on portions of those images that will have other elements overlaid on them once rendered on a web page. For example, a web page may contain 2 overlapping images by design. For example, the server-side process may crop the image at the back to only include portions of the image that are visible once the front image is overlaid on top of it.

Particular embodiments may rotate images through a two-dimensional (2D) or three-dimensional (3D) space based on a desired appearance on a mobile device, before delivery to the mobile device. Mobile devices are capable of rotating images once downloaded, although the cost of doing so may be prohibitive in terms of scrolling speed and processor utilization. For example, a web page may have an image rotated by 30 degrees counterclockwise. In particular embodiments, the server-side process may rotate the image, before transmitting the image to the mobile device. For example, an image may be rotated so as to appear to 'lift off' the page by rotating in 3D space. In particular embodiments, the server-side process may calculate this 3D rotation, creating a rotated image based on the calculation, and transmit the rotated image to the mobile device.

Particular embodiments may apply one or more filters to an image based on a desired effect, before delivery the image to a mobile device. For example, a filter can be an adjustment in hue, brightness, or color level of an image. For example, a filter can display pixels within an image to produce a desired effect (e.g., a funhouse-mirror effect, or removing blurriness of an image). Particular embodiments contemplate any suitable image filers. In particular embodiments, the server-side process may apply one or more filters to an image based on a desired effect, and transmit the filtered image to the mobile device.

Particular embodiments contemplate any combination of adjustments to an image for delivery the image to a mobile device. For example, the server-side process may first scale down the example image of FIG. 3A and than crop the example image to include not only the objects (e.g., 311, 312, 313, and 314) but also a portion of the environment surrounding the objects. The scaled and cropped image can provide a clear view of the objects and a context about what the objects were doing at the time when the image was taken. For example, the server-side process may crop, scale, rotate, and apply a filter to an image, before transmitting the image to a mobile device.

Particular embodiments may adjust one or more images for delivery to a mobile device based on existing tags in the one or more images. For example, particular embodiments may crop an image based on one or more tagged region within the image. As described earlier, a region of an image can be tagged or associated to a user by using the methods described in U.S. Pat. No. 7,945,653. For example, the server-side process may receive a request for the example image of FIG. 3A from a user's mobile device. The server-side process may access the image (stored in data stores 101) and identify a region being tagged to the user (e.g., region 320 as illustrated in FIG. 3G). The server-side process can crop the example image of FIG. 3A to include the region tagged to the user (and fit within the size of the mobile device's display or a container), as illustrated in FIG. 3G.

Figure 3I:
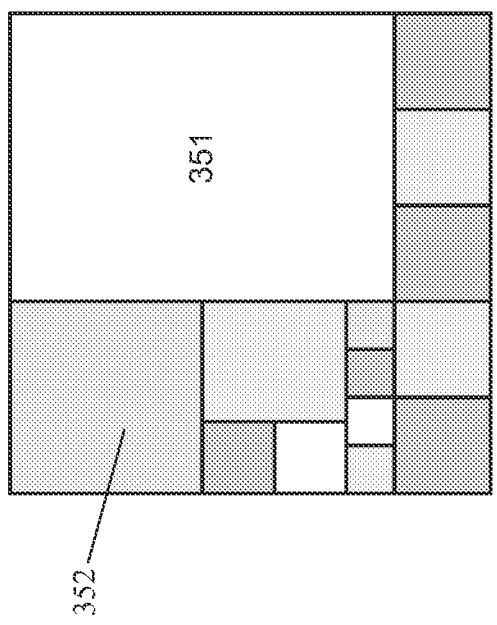

Particular embodiments may adjust one or more images for delivery to a mobile device based on image quality of the one or more images. For example, in response to a user's request, the server-side process may access a photo album (e.g., from a rock concert) and create a photo mosaic as illustrated in FIG. 3I. For example, the server-side process may determine a shading level (e.g., by using an image processing software) for each image for the mosaic, and arrange the images based on alternating shading levels, as illustrated in FIG. 3I. In addition, for example, the server-side process may identify one or more photos (from the photo album) with one or more faces (or physical objects) corresponding to users (or concepts) that are within a pre-determined degree separation from the user (e.g., the user's first-degree friends). The server-side process can arrange the identified photos (i.e., photos with objects more relevant to the user) in larger tiles (e.g., 351, 352) of the mosaic illustrated in FIG. 3I.

In particular embodiments, the server-side process may transmit to the mobile device one or more of the images as adjusted (204). For example, in response to a request for delivery to a mobile device the example image of FIG. 3A, the server-side process may adjust the example image based on the mobile device's display capabilities, and transmit one or more adjusted images (e.g., the example image of FIG. 3E) to the mobile device to be presented in the mobile device's display. In some embodiments, the server-side process may store (or cache) the adjusted copies of the images in data stores 101. For example, in response to a request for an image for delivery to a mobile device (201), the server-side process may access one or more data stores for display capabilities of the mobile device (202), or determine display capabilities of the mobile device as described earlier, and access data stores 101 for adjusted copies of the image that may match the display capabilities of the mobile device. If a matched copy of the image is found, the server-side process can transmit the matched copy to the mobile device (204).

The example method of FIG. 2 can be implemented with content distribution network 130. For example, in one embodiment, the server-side process may receive a request for delivery to a mobile device one or more images (201), access one or more data stores for display capabilities of the mobile device (202), or determine display capabilities of the mobile device as described earlier, and determine adjustment parameters (e.g., cropping size, cropping coordinates) of one or more of the images based the display capabilities. The server-side process may transmit to the mobile device a message comprising adjustment parameters for one or more of the images and a pointer or identifier of copies of the images stored in content distribution network 130. For example, the message may comprise an URL including cropping size or coordinates for the images. The mobile device may transmit the message to content distribution network 130. In response to the message, application server 131 (or another server-side process hosted by one or more computing devices of content distribution network 130) may access content data stores 132 for copies of the images, adjust one or more of the images based on the adjustment parameters (203). Alternatively, Application server 131 may access data stores 132 for adjusted copies of the images that match the adjustment parameters. Application server 131 may transmit to the mobile device one or more of the images as adjusted (204). Application Server 131 may store (or cache) the adjusted copies of the images in data stores 132 for later use as described earlier.

By way of example and not by way of limitation, example URL's including adjustment parameters are provided here. For example, an URL for an image of a size of 720×537 can be:

http://photos-d.ak.fbcdn.net/hphotos-ak-snc6/208352_10100149240258148_2729237_49967111_8099422_n.jpg An URL below illustrates example cropping parameters. In this example URL, (183, 0) are the coordinates of the top-left corner of a crop box and 537×537 is a size of the crop box. The resulting image size is 537×537.

http://photos-d.ak.fbcdn.net/hphotos-ak-snc6/c183.0.537.537/208352_10100149240258148_2729237_49967111_8099422_n.jpg An URL below illustrates example scaling parameters. In this example URL, 180×540 defines a size of a box. A server-side process can scale down the image while preserving aspect ratio until the image can be fully contained in the box. The resulting image size is 180×134.

http://photos-d.ak.fbcdn.net/hphotos-ak-snc6/s180x540/208352_10100149240258148_2729237_49967111_8099422_n.jpg An example URL below includes both cropping and scaling parameters The resulting image size is 180×180.

http://photos-d.ak.fbcdn.net/hphotos-ak-snc6/c183.0.537.537/s180x540/208352_10100149240258148_2729237_49967111_8099422_n.jpg Yet in another embodiments, the server-side process may transmit to the mobile device a message (e.g., an URL) comprising a pointer or identifier of copies of the images stored in content distribution network 130. The mobile device may transmit the message to content distribution network 130. Alternatively, the mobile device may transmit a request for one or more images to content distribution network 130 (e.g., an URL for an image can point directly to content distribution network 130). In response to the message (or the direct request), application server 131 (or another server-side process hosted by one or more computing devices of content distribution network 130) may access one or more data stores for display capabilities of the mobile device (202), or determine display capabilities of the mobile device as described earlier, and adjust one or more of the images based on the display capabilities (203). Alternatively, Application server 131 may access content data stores 132 for adjusted copies of the images (that may match the display capabilities of the mobile device). Application server 131 may transmit to the mobile device one or more of the images as adjusted (204). Application Server 131 may store (or cache) the adjusted copies of the images in data stores 132 for later use as described earlier.

Figure 4:
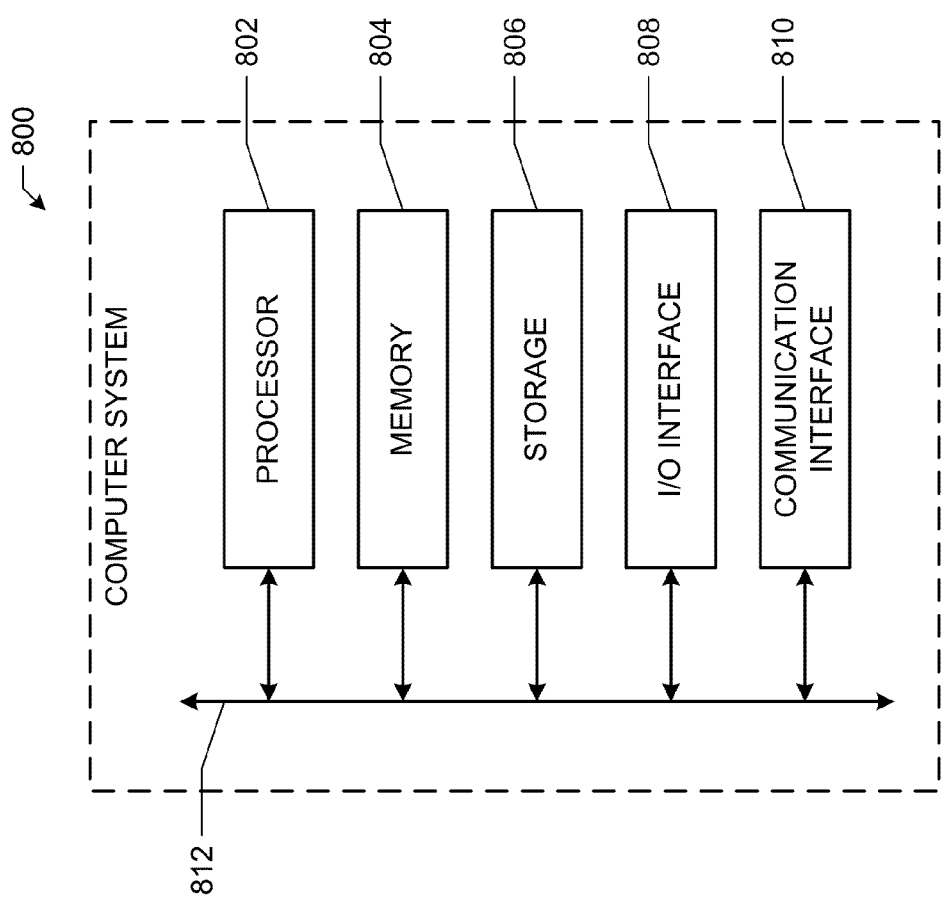
FIG. 4 illustrates an example computer system.

FIG. 4 illustrates an example computer system 800, which may be used with some embodiments of the present invention. This disclosure contemplates any suitable number of computer systems 800. This disclosure contemplates computer system 800 taking any suitable physical form. As example and not by way of limitation, computer system 800 may be an embedded computer system, a system-on-chip (SOC), a desktop computer system, a mobile computer system, a game console, a mainframe, a mesh of computer systems, a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. In particular embodiments, memory 804 includes main memory for storing instructions for processor 802 to execute or data for processor 802 to operate on. As an example and not by way of limitation, computer system 800 may load instructions from storage 806 to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM).

In particular embodiments, storage 806 includes mass storage for data or instructions. As an example and not by way of limitation, storage 806 may include an HDD, a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), or flash memory or a combination of two or more of these.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, microphone, display, touch screen, mouse, speaker, camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) for communicating with an Ethernet or other wire-based network or a wireless NIC (WNIC) for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (e.g., a BLUETOOTH WPAN), a WI-FI network (e.g., a 802.11a/b/g/n WI-FI network,), a WI-MAX network, a cellular network (e.g., a Global System for Mobile Communications (GSM) network, a Long Term Evolution (LTE) network), or other suitable wireless network or a combination of two or more of these.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an INFINIBAND interconnect, a low-pin-count (LPC) bus, a memory bus, a Peripheral Component Interconnect Express or PCI-Express bus, a serial advanced technology attachment (SATA) bus, a Inter-Integrated Circuit (I2C) bus, a Secure Digital (SD) memory interface, a Secure Digital Input Output (SDIO) interface, a Universal Serial Bus (USB) bus, a General Purpose Input/Output (GPIO) bus, or another suitable bus or a combination of two or more of these. Bus 812 may include one or more buses 812, where appropriate.

Herein, reference to a computer-readable non-transitory storage medium may include a semiconductor-based or other integrated circuit (IC) (such as, for example, a field-programmable gate array (FPGA) or an application-specific IC (ASIC)), a hard disk drive (HDD), a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable computer-readable non-transitory storage medium, or a suitable combination of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices:
    receiving, from a mobile device, a request for one or more images;
    adjusting one or more of the images based at least partly on one or more display capabilities of the mobile device, wherein one or more of the images are adjusted to have a landscape orientation or a portrait orientation; and
    sending to the mobile device one or more of the images as adjusted.

2. The method of claim wherein:
    the request comprises an identifier of the mobile device; and
    the method further comprises, in response to the request:
    accessing, based at least in part on the identifier of the mobile device, one or more data stores for the one or more display capabilities of the mobile device; and
    adjusting one or more of the images based on one or more display capabilities of the mobile device for sending to the mobile device.

3. The method of claim 1, wherein the adjusting one or more of the images comprises:
    scaling one or more of the images; or
    cropping one or more of the images.

4. The method of claim 1, wherein the adjusting one or more of the images comprises:
    identifying one or more objects displayed in one of the images;
    determining a relevance of each object in the image to the user associated with the mobile device; and
    including in or excluding from the image as adjusted one or more of the objects based on their relevance to the user.

5. The method of claim 4, wherein;
    each of one or more of the objects is a person; and
    the relevance of a person comprises a social closeness between the user and the person in a social-networking system.

6. The method of claim 4, wherein:
    each of one or more of the objects correspond to one or more nodes in a social graph of a social-networking system; and
    the relevance of an object corresponding to one or more nodes in the social graph is based on an association between a node in the social graph corresponding to the user and one or more of the nodes in the social graph corresponding to the object.

7. The method of claim 1, wherein the adjusting one or more of the images comprises adjusting one or more of the images based on location data indicating a location of a user associated with the mobile device.

8. The method of claim 1, wherein the adjusting one or more of the images comprises adjusting one or more of the images based on image quality of the one or more images.

9. One or more computer-readable non-transitory media embodying software that is operable when executed to:
receive, from a mobile device, a request for one or more images;
adjust one or more of the images based at least partly on one or more display capabilities of the mobile device, wherein one or more of the images are adjusted to have a landscape orientation or a portrait orientation; and
send to the mobile device one or more of the images as adjusted.

10. The media of claim 9, wherein:
the request comprises an identifier of the mobile device, and
the software is further operable when executed to, in response to the request:
access, based at least in part on the identifier of the mobile device, one or more data stores for the one or more display capabilities of the mobile device; and
adjust one or more of the images based on one or more display capabilities of the mobile device for sending to the mobile device.

11. The media of claim 9, wherein to adjust one or more of the images, the software is operable when executed to:
scale one or more of the images; or
crop one or more of the images.

12. The media of claim 9, wherein to adjust one or more of the images, the software is operable when executed to:
identify one or more objects displayed in one of the images;
determine a relevance of each object in the image to the user associated with the mobile device; and
include in or exclude from the image as adjusted one or more of the objects based on their relevance to the user.

13. The media of claim 12, wherein:
each of one or more of the objects is a person; and
the relevance of a person comprises a social closeness between the user and the person in a social-networking system.

14. The media of claim 12, wherein:
each of one or more of the objects correspond to one or more nodes in a social graph of a social-networking system; and
the relevance of an object corresponding to one or more nodes in the social graph is based on an association between a node in the social graph corresponding to the user and one or more of the nodes in the social graph corresponding to the object.

15. The media of claim 9, wherein to adjust one or more of the images, the software is operable when executed to adjust one or more of the images based on location data indicating a location of a user associated with the mobile device.

16. The media of claim 9, wherein to adjust one or more of the images, the software is operable when executed to adjust one or more of the images based on image quality of the one or more images.

* * * * *